United States Patent [19]

Jdid et al.

[11] Patent Number: 4,656,012

[45] Date of Patent: Apr. 7, 1987

[54] PROCESS FOR THE RECOVERY OF URANIUM FROM PHOSPHORIC ACID SOLUTIONS

[75] Inventors: El aïd Jdid, Vandoeuvre-les-Nancy; Pierre Blazy, Nancy; Jacques Bessiere, Gondreville; Jean C. Tracez, Sceaux; Philippe Haicour, Paris, all of France

[73] Assignee: Ceca S.A., Villacoublay, France

[21] Appl. No.: 741,214

[22] Filed: Jun. 5, 1985

Related U.S. Application Data

[63] Continuation of Ser. No. 546,853, Oct. 31, 1983, abandoned.

[30] Foreign Application Priority Data

Oct. 29, 1982 [FR] France .............................. 82 18142

[51] Int. Cl.$^4$ ............................................ C01G 43/00
[52] U.S. Cl. ........................................ 423/11; 423/8; 423/9; 423/10; 423/321 R
[58] Field of Search ................ 423/321 R, 321 S, 319, 423/320, 8, 9, 10, 11

[56] References Cited

U.S. PATENT DOCUMENTS

| | | | |
|---|---|---|---|
| 2,859,092 | 11/1958 | Bailes et al. | 423/8 |
| 4,246,637 | 1/1981 | Bradford et al. | 423/10 |
| 4,316,877 | 2/1982 | Tunick et al. | 423/10 |
| 4,579,720 | 4/1986 | Budnick | 423/10 |

FOREIGN PATENT DOCUMENTS

| | | | |
|---|---|---|---|
| 0023173 | 1/1981 | European Pat. Off. | 423/10 |
| 2460960 | 9/1983 | France . | |
| 454836 | 10/1975 | U.S.S.R. | 423/10 |

*Primary Examiner*—Gregory A. Heller
*Attorney, Agent, or Firm*—Burgess, Ryan & Wayne

[57] ABSTRACT

The invention concerns the recovery of heavy metals from concentrated solutions.

The process comprises complexing the metals with an organophosphorous complexing agent and recovering the metallic complex by sedimentation, filtration, flotation and the like.

The process can be used to recover uranium and rare earths from phosphoric acid solutions.

13 Claims, No Drawings

PROCESS FOR THE RECOVERY OF URANIUM FROM PHOSPHORIC ACID SOLUTIONS

This application is a continuation of application Ser. No. 546,853, filed Oct. 31, 1983, now abandoned.

The invention is directed to the use of organophosphorous derivatives for the direct recovery of heavy metals from dilute solutions thereof in a concentrated aqueous acid media, and particularly, from industrial phosphoric acid, by a complexing process followed by extraction of the complex, preferably by flotation.

BACKGROUND OF THE INVENTION

Some phosphate minerals contain uranium in a higher concentration than most of the constituents of the terrestrial layer (from a few tenths to a few hundred parts per million compared to about 3 parts per million).

During production of phosphoric acid by the wet process method, the phosphate mineral or rock is reacted with a mineral acid, generally sulfuric acid, and almost all of the uranium passes into the phosphoric acid in the form of $U+4$ and $U+6$ ions. A phosphoric acid produced from a Florida mineral: can have the following composition: $P_2O_5$: 29.37%—$SO_4$: 2.77%—F: 2.15%—different materials in solution: 0.18%—$Fe_2O_3$: 0.86—$Al_2O_3$: 0.81%—MgO: 0.35%—$U_3O_8$: 1.66 parts per million (ppm).

With this mineral, it is possible to produce about 500 g uranium oxide $U_3O_8$ per ton of $P_2O_5$, which corresponds to about 150 tons a year of uranium oxide in an industrial unit producing 1,000 tons per day of $P_2O_5$.

Processes have been used for purifying phosphoric acid and at the same time recovering the uranium. The processes that have been developed commercially are the liquid-liquid extraction processes. The liquid-liquid extraction processes can be classified into 3 groups:

(1) Extraction of uranium, reduced to the $U+4$ state by octyl phenyl esters of orthophosphoric acid, (MOPPA-DOPPA) or octyl pyrophosphoric acid (OPPA) in a solution in kerosene.

(2) Extraction of uranium, oxidized in the $U+6$ state, by a solvent comprising a mixture of bis(2 ethylhexyl)-phosphoric acid (D2EHPA) and trioctyl phosphine oxide (TOPO).

(3) A mixed processes using OPPA and a D2EHPA and TOPO mixture (disclosed in U.S. Pat. No. 3,835,214).

Other processes have been disclosed, that use solutions of more complex reagents such as the diphosphonic acid esters described in French patent application No. 2,460,958.

These processes are objectionable because of a low extraction efficiency requiring multiple extraction stages coupled with a further complication involving a solvent regeneration cycle requiring many steps. In addition, contacting the acid with the extractive solvents causes a considerable loss of solvents and contamination of the acid produced.

BRIEF SUMMARY OF THE INVENTION

According to the present invention, the uranium and other heavy metals dissolved in a concentrated acid media are complexed with a complexing organophosphorous derivative and recovered by separation from the concentrated acid by liquid solid separation means. The complexed metals can be separated by sedimentation, filtration, centrifugation flotation and other separating methods.

Applicants have discovered that the heavy metals could be complexed by complexing agents of the anionic type and more specifically by organophosphorous polydentated complexing-agent products that can act as flotation collectors and be separated from the concentrated acid by flotation or other physical separation means.

The unexpected nature of the invention lies in making a complex, precipitating and floating the uranium ions in the form of $U+4$, or other heavy metals such as rare earth, zirconium, vanadium, titanium etc., by means of anionic collectors. The anionic reagents must have the following properties:

a complexing agent for uranium or other heavy metals capable of being extracted by this technique;

stability in a concentrated media;

soluble or at least perfectly dispersible in said concentrated acid media. This property is of great practical importance. It strongly differentiates the complexing agents useful in the present invention from the reagents used in the above cited techniques of liquid-liquid extraction and for which insolubility is a dominant property.

The solubility or dispersibility of the ionic flotation collector is a property either of the molecule itself or of the formulation under which the product is used.

These properties are found in the chemical group of the polydentated organophosphorous derivatives of the general formula:

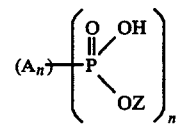

wherein

A is an N-valent hydrocarbon moiety that can contain heteroatoms such as N, O, or P.

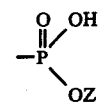

is a phosphoric acid group wholly or at least partially responsible for the complexing activity, and is present in sufficient numbers to satisfy the N valences of the A moiety.

Z is independently H or an aliphatic moiety R of from 1 to about 24 carbon atoms, n is an integer greater than 1 and preferably from 2 to about 5.

DETAILED DESCRIPTION OF THE INVENTION

The method for recovery, by flotation, of compounds in solution—which is different from the conventional techniques of separation of solid particles—has been known since 1959. It was introduced by Sebba A (Nature, London 1959, No. 154 1062). The principle is as follows:

There is introduced into the solution to be extracted, a stoichiometric quantity of a complexing reagent susceptible of combining with the ion to be extracted, and the combination obtained is collected on the surface of the solution in the form of a foam by means of fine gaseous bubbles produced within the medium to be extracted. One tends to use the terms of "flotation by foaming" when the flotable combination is soluble in the initial medium and of "floatation of precipitate" when said combination is insoluble therein, without this distinction being always evident. We shall keep for convenience in the continuation of the description the general term of "ionic flotation".

This technique has been the object of numerous works, especially in the field of decontamination of industrial waters or radioactive waters. For the recovery of uranium, there must be equally cited the application to the separation of this metal from sea water (Kim Young S et al, Anal. Chem. 1971-43 (11) 1370/3).

The process has never been applied to recovery of heavy metals from dilute solutions in concentrated acid media and in particular, to the recovery of uranium from wet process phosphoric acid.

It was known in fact that uranium in acid solution gave anionic complexes and was therefore extractable by cationic complexing agents such as alkyl pyridinium or alkyl trimethyl ammonium salts. This fact had even been confirmed in the case of uranium solutions in concentrated hydrochloric acid from which uranium could be extracted with the aid of a cationic collector (Jacobelli—Turin et al Ind. Eng. Chem. Process, design & dev. 6 No. 2 1967).

The complexing agents utilized in the present invention are of the anionic type and generally comprise organopolyphosphonates of the formula

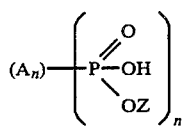

(I)

wherein: $A_n$ is an n-valent hydrocarbon moiety that can contain heteroatoms such as N,O,P.

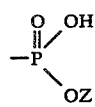

is the group wholly or partially responsible for the complexing activity repeated n times, wherein
   Z is H or an aliphatic moiety R of from 1 to about 24 carbon atoms,
   n is an integer greater than 1, and preferably from 2 to 5.

When the complexing agent leads to a hydrophobic metallic complex, the structure includes aliphatic elements having more or less long chain lengths that are found either in the phosphorous group or in the $A_n$ group.

The group of complexing agents with aliphatic chains in the phosphorous group comprise compounds of the phosphonic diester type of the formula:

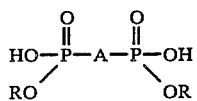

(II)

wherein: A is a divalent hydrocarbonated group having from about 1 to 10 carbon atoms and R is independently an alkyl radical having 4–24 carbon atoms.

These products have been described and their manufacture and application to the liquid-liquid extraction disclosed in French patent application No. 2,460,958.

When the n-valent group $A_n$ has the formula

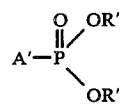

Wherein A' is an n-valent group there is obtained a group of polyphosphonic acid ester compounds comprising, for example, the triphosphonic acid esters of the formula:

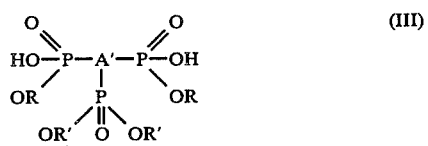

(III)

wherein
   A' is a trivalent hydrocarbonated group having from about 3 to 10 carbon atoms;
   R is an aliphatic radical having from 1 to 24 carbon atoms and;
   R' is an aliphatic group having from 4 to 24 carbon atoms.

The products have been described and their manufacture and application to liquid-liquid extraction have been disclosed in French patent application No. 2,460,960.

To the group of complexing agents with an aliphatic chain which form part of the group $A_n$, there likewise belong the structures of the type alkylaminopolymethylene phosphonic acids of the formula:

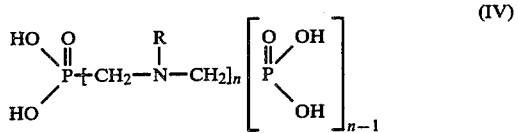

(IV)

and the methylene polyphosphonic acids derived from alkylpolymethylene polyamines.

The aliphatic esters derived fron nitrilo trismethylene phosphonic acid, ethylene diaminetetramethylene phosphonic acid and the homologues thereof are useful as reagents in the invention.

When the complexing agent results in a non-hydrophobic metal complex, its structure does not include any particularly long aliphatic chain. Among products of this kind can be cited complexing agents otherwise very well known such as the methylene phosphonates derived from the polyethylene polyamines.

An especially useful composition for use in the present invention is the ethylene diamine derivative of the formula:

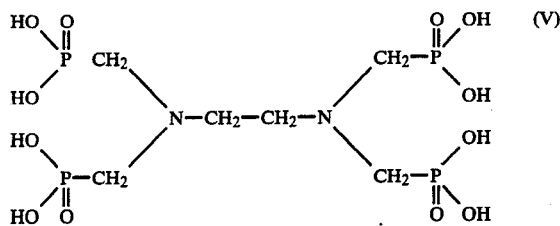

These products provide a non-hydrophobic metal complex that gives rise to floatable products when associated with a hydrophobic co-reagent. The co-reagent, for reasons of compatibility, is preferably selected from compounds having the general formula I.

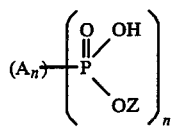

wherein: n=1 or 2 and includes a long aliphatic radical of 4 to 24 carbon atoms as Z or $A_n$. Particularly advantageous are the alkyl aminophosphonic acids of formula (IV) described above.

EXAMPLE I

In a liquor comprising 5.5M phosphoric acid enriched with yttrium nitrate to a content of 200 ppm yttrium metal, there is introduced 1000 ppm of a reagent of formula III, dimethyl P1 P3-dioctyl P1 P2-ester of propane 1-2-3 triphosphonic acid.

There is almost instantaneously obtained a precipitate recoverable by filtration that contains 92% of the initially present yttrium.

EXAMPLE II

The yttric solution of Example I is introduced into a device comprising a vessel equipped in its upper portion with an outlet and by fritted glass in its lower portion. There is added 1000 ppm of the preceding reagent and air is bubbled through the mixture for about 30 minutes. The foam collected at the outlet includes a white precipitate that contains 89% of the yttrium in the acid.

EXAMPLE III

The precipitation and flotation tests described in Examples I and II are repeated using as the metallic solution, a liquor containing by 5.5M phosphoric acid artificially enriched in uranyl nitrate and where the uranium has been reduced to the +4 valence by reduction with iron powder. The liquor contains 120 ppm uranium metal.

The test is effected with octylpyrophosphonic acid (OPPA), di-2-ethyl hexyl phosphonic acid (D2EHPA) and trioctylphosphonic oxide (TOPO), which are known reagents for liquid-liquid extraction of uranium, and with the triphosphonic acid ester of Example I compounded according to the invention.

OPPA partially precipitates the uranium (the uranium content in the precipitate is 3.8%), but there is no recovery by flotation.

The D2EHPA and TOPO give precipitates rich in uranium (respectively 7.9% and 5.2% uranium), but with a very poor yield. There is no recovery by flotation.

Triphosphonic acid ester, according to the present invention, strongly precipitates uranium (recovery 95%); the precipitate is wholly floatable and contains 1% iron and 4.8% uranium.

The example shows the advantage of the process according to the invention in comparison to the reagents commonly used for the liquid-liquid extraction.

EXAMPLE IV

In the testing device described in Example II, there is introduced a liquor constituted by 5.5 phosphoric acid enriched in uranium for a U content of 10 ppm. The salt used is uranyl acetate and the uranium is restored in the +4 U state with iron powder.

There is introduced into this solution ethylene diamine tetramethylene phosphonic acid in a concentration of 7.10 ppm, and 7.1 ppm of a co-reagent, hexylaminodimethylene phosphonic acid.

After passing air bubbles through the mixture for 30 minutes, there is collected a foam that contains, in the form of a green precipitate, 80% of the uranium in the acid.

EXAMPLE V

The test of Example IV is repeated on an industrial phosphoric acid made from a Florida phosphate mineral and containing about $5 \times 10^{-4}$ mol uranium. There is obtained in the floated portion a recovery of 78% of the uranium present in the solution. The collected product includes other metals present in the industrial acid, amont them iron and rare earths (yttrium and lanthanides), zirconium, vanadium, and titanium. The uranium content of the dry precipitate recovered exceeds 2%.

EXAMPLE VI

This example illustrates the use of a hydrophobic reagent. There is carried out an extraction using the experimental device of Example II. The acid used is an industrial phosphoric acid. The reagent used is a dilauryl ester of a propene-2, diyle 1,2-diphosphonic acid described in French patent application No. 2,460,958.

An amount of the reagent diphosphonic acid is introduced into the acid to provide a molar concentration equal to 4 times the uranium concentration of the acid. Flotation is obtained without the need of a co-reagent (hydrophobic uranium complex). The recovery is 71% at room temperature and the floated precipitate contains 7.5% uranium.

EXAMPLE VII

A precipitation by flotation is carried out under the same conditions as Example VI, but the temperature is kept at 60° C.; the yield is 81% and the floated product contains 10% uranium.

EXAMPLE VIII

The work is also carried out under the same conditions as in Example VI, but the reagent/uranium proportion here is brought to 6. The uranium recovery is 96% and the uranium content of the floated precipitate is 7% of the dry extract.

It is thus seen that it is possible to recover uranium from concentrated solutions of phosphoric acid by a simple process with a satisfactory yield. The process is not limited to recovery of uranium but can be applied to the direct extraction of heavy metals from concentrated solutions. The invention comprises all the other modes of direct extraction of heavy metals in the form of their precipitated anionic complex like sedimentation, filtration, centrifugation, liquid cyclones and the like.

We claim:

1. A non-solvent extraction process for the recovery of uranium from a concentrated phosphoric acid solution comprising complexing the uranium with a complexing amount of a polyphosphonic acid complexing agent of the formula:

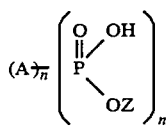
(I)

wherein:

($A_n$) is an n-valent hydrocarbon group that can contain heteroatoms such as N, O, P,

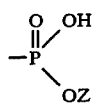

is a phosphonic acid group present in sufficient numbers to satisfy the n valences of the $A_n$ moiety, Z is H or an aliphatic group of from 1 to 24 carbon atoms, n is an integer greater than 1, and separating the complex formed directly from the concentrated acid solution by ionic flotation, whereby gaseous bubbles are passed through said acid solution and a foam containing said complex collects on the surface thereof.

2. A process according to claim 1, wherein n is an integer of from 2 to about 5.

3. A process according to claims 1 or 30, wherein said complexing agent forms a hydrophobic metallic complex with uranium.

4. A process according to claim 3, wherein the complexing agent is a phosphonic acid diester of the formula

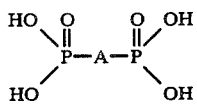
(II)

wherein A is a hydrocarbon group having from 1 to about 10 carbon atoms and R is an alkyl radical having 4-24 carbon atoms.

5. A process according to claim 3, wherein the complexing agent is a triphosphonic acid ester of the formula

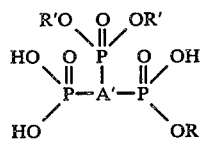

wherein

A' is a trivalent hydrocarbon group having from 3 to about 10 carbon atoms,

R is an aliphatic hydrocarbon radical having from 1 to 24 carbon atoms,

R' is an aliphatic hydrocarbon radical comprising from 4 to 24 carbon atoms.

6. A process according to claim 3, wherein the complexing agent is an alkylaminopolymethylene phosphonic acid of the formula

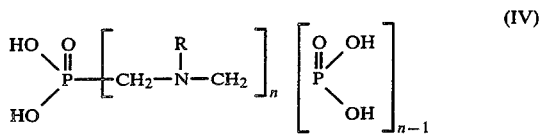
(IV)

and the esters thereof, wherein n is an integer greater than 1 and R is an aliphatic radical of 1 to 24 carbon atoms.

7. A process according to claim 1 or 2, wherein the complexing agent provides an non-hydrophobic uranium complex, and is associated with a hydrophobic co-reagent.

8. A process according to claim 7, wherein the complexing agent is a polyethylene polyamine methylene polyphosphonic acid.

9. A process according to claim 8, wherein said complexing agent is an ethylene diamine of the formula:

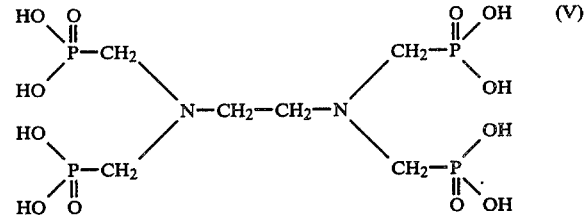
(V)

10. A process according to claim 7 wherein the hydrophobic co-reagent is a complexing agent of claim 6.

11. A process according to claim 5, wherein the complexing agent is the dilaurylester of 2-propen, 1,2-diyle diphosphonic acid.

12. A process according to claim 5, wherein the complexing agent is $P_1$, $P_3$-dimethyl-$P_2$, $P_2$ dioctyl ester of propane-1,2,3-triphosphonic acid.

13. A non-solvent extraction process for the recovery of uranium from a concentrated phosphoric acid solution comprising converting the uranium to the +4 valence state, complexing the uranium with a complexing amount of a polyphosphonic acid complexing agent of the formula:

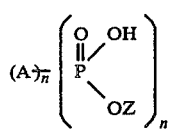
(I)

wherein:

($A_n$) is an n-valent hydrocarbon group that can contain heteroatoms each as N, O, P,

is a phosphonic acid group present in sufficient numbers to satisfy the n valences of the $A_n$ moiety Z is H or an aliphatic group of from 1 to 24 carbon atoms, n is an integer greater than 1, bubbling air through the solution whereby a foam is formed containing the complex, and separating the complex directly from the concentrated acid solution by ionic flotation.

* * * * *